US006787043B1

(12) United States Patent
Cho et al.

(10) Patent No.: US 6,787,043 B1
(45) Date of Patent: Sep. 7, 2004

(54) WATER PURIFICATION SYSTEM AND METHOD

(75) Inventors: Moon-Ki Cho, Seoul (KR); Han-Young Kang, Anyang-si (KR)

(73) Assignee: Moon-Ki Cho, Seoul (KR)

( * ) Notice: Subject to any disclaimer, the term of this patent is extended or adjusted under 35 U.S.C. 154(b) by 0 days.

(21) Appl. No.: 10/240,625

(22) PCT Filed: Mar. 30, 2000

(86) PCT No.: PCT/KR00/00288

§ 371 (c)(1),
(2), (4) Date: Sep. 30, 2002

(87) PCT Pub. No.: WO01/72640

PCT Pub. Date: Oct. 4, 2001

(51) Int. Cl.[7] .............................. C02F 1/46; C02F 1/48; C02F 1/76

(52) U.S. Cl. ....................... 210/695; 210/721; 210/748; 210/760; 210/806; 210/202; 210/203; 210/205; 210/223; 210/243; 210/252; 210/259; 210/295; 422/22; 422/186.04; 422/186.07; 204/554; 204/557; 204/565; 204/660; 204/664; 204/665; 204/666

(58) Field of Search ................................ 210/695, 721, 210/748, 760, 767, 806, 198.1, 200, 201, 202, 203, 205, 222, 223, 243, 252, 259, 295; 422/22, 186.04, 186.07; 204/554, 557, 565, 660, 664, 665, 666

(56) References Cited

U.S. PATENT DOCUMENTS

| | | | | |
|---|---|---|---|---|
| 5,458,758 A | | 10/1995 | Suchacz | |
| 5,888,403 A | * | 3/1999 | Hayashi | 210/695 |
| 5,893,977 A | * | 4/1999 | Pucci | 210/243 |
| 6,673,248 B2 | * | 1/2004 | Chowdhury | 210/760 |

FOREIGN PATENT DOCUMENTS

| | | |
|---|---|---|
| DE | 196 15 620 | 4/1996 |
| GB | 2 261 880 A | 11/1991 |

* cited by examiner

*Primary Examiner*—David A. Reifsnyder
(74) *Attorney, Agent, or Firm*—Blakely Sokoloff Taylor & Zafman

(57) ABSTRACT

A water purification system and method using an ionizer and an ozonation treatment for ionization, oxidation and/or decomposition of undegradeable contaminants is disclosed. A high electron-inducing voltage is first applied to the water in the ionizer so that undergradeable materials are ionized and/pr decomposed, then the water is mixed with ozone so the water is purified to be potable.

16 Claims, 3 Drawing Sheets pure water
magnetizer
16
filter
15
Ozone
Ozone mixer
Ozone generator
13
14
filter
12
11
Ionizer
waste water
Power supply
17

WATER PURIFICATION SYSTEM AND METHOD

TECHNICAL FIELD

The present invention relates to a water purification system and method, and more particularly, to such a system and method wherein polluted water is purified by the use of an ionizer and an ozonation treatment for the decomposition and oxidation of indecomposable contaminants.

BACKGROUND ART

Many water pollution problems are being caused by improper disposal of chemicals and/or chemical compounds into ground water reservoirs, streams, lakes and rivers. It is highly desirable that treatment of these polluted waters be accomplished without the addition of even more chemicals which may result in another form of pollutant or damage to the ecology.

Since any waste water treatment system that adds chemicals such is as chlorine, polyelectrolytes or other flocculates to kill organisms or remove metals and chemicals will necessarily require the production of such materials before use, it is ecologically desirable to provide a purification system which minimizes the requirement for any further manufacture of materials to be used in the treatment process.

Chlorine has been traditionally employed for disinfecting both water for domestic use and wastewater. However, chlorine has been shown to react with humic substances present in such waters to produce trilialomethanes (THM) such as chloroform, which are identified as carcinogens in animals.

Electrochemical methods are sometimes used to remove or decompose chemical impurities in water. Anodic oxidation may be used to destroy cyanide and phenols, ammonia, and organic dyes.

Although ozone has been used for treatment of drinking water as early as 1903, it has been under-utilized as many people have considered its use only as a disinfectant and have failed to utilize ozone for its highly reactive oxidation qualities. In other words, the traditional use of ozone has been to kill bacteria, rather than to aid in the decomposition and/or removal of contaminants.

DISCLOSURE OF INVENTION

It is an object of the present invention to provide a water purification system and method that uses an ionizer and an ozonation treatment which performs efficient ionization, decomposition or oxidation of undegradable contaminants such as most heavy metals and other inorganic materials, many organic materials including hydrocarbons, phenols, THM, cyanide, pesticides and others, without adding any chemicals.

It is another object of the present invention to provide an ionizer which is capable of inducing and accelerating exited electrons by a high frequency, high voltage power, thereby ionizing or decomposing undegradable materials in water.

A particularly advantageous feature of preferred embodiments of the present invention is that it can be applied to a variety of different types of water treatment, including, but not limited to, drinking water treatment or waste water treatment in domestic, industrial or stock raising applications.

To achieve these and other objects and features, as embodied and broadly described herein, the invention comprises:

at least one ionizer including:

- a cylindrical chamber having an inlet and an outlet for water flow;
- at least one rod anode which is surrounded with a coaxial cylindrical dielectric sheath;
- at least one rod cathode which is surrounded with a coaxial cylindrical dielectric sheath;
- at least one cylindrical mesh grid which is coaxial with and surrounds cathode;

an ozone generator for producing ozone, and an ozone mixer for mixing the water with ozone provided by the ozone generator.

According to another aspect of the invention, a water purification method is disclosed, comprising the steps of:

(a) providing at least one ionizer adapted to create an electric field;

(b) energizing the ionizer with a high voltage, such that an electric field is created;

(c) passing the water through the ionizer so decomposition and oxidation of undegradable materials is performed;

(d) filtering sludge which is formed in the above step; and (e) introducing ozone into and mixing it with the water.

According to still another aspect of the present invention, an ionizer used in the water purification system is provided, comprising:

a cylindrical chamber having an inlet and an outlet for water flow, the chamber made to permit the water to flow along a flow path from the inlet to the outlet, at least one rod anode which is surrounded with a coaxial cylindrical dielectric sheath;

at least one rod cathode which is surrounded with a coaxial cylindrical dielectric sheath; and at least one cylindrical mesh grid which is coaxial with and surrounds the cathode, wherein both ends of the cylindrical chamber are hermetically capped by a mounting fixture formed to provide a waterproof fit.

Both the foregoing general description and the following Detailed Description are exemplary and are intended to provide further explanation of the invention as claimed.

BRIEF DESCRIPTION OF DRAWINGS

The accompanying drawings provide a further understanding of the invention, and together with the Detailed Description, explain the principles of the invention. In the drawings.

BEST MODE FOR CARRYING OUT THE INVENTION

The present invention will be described in detail with reference to the accompanying drawings.

Figure 1:
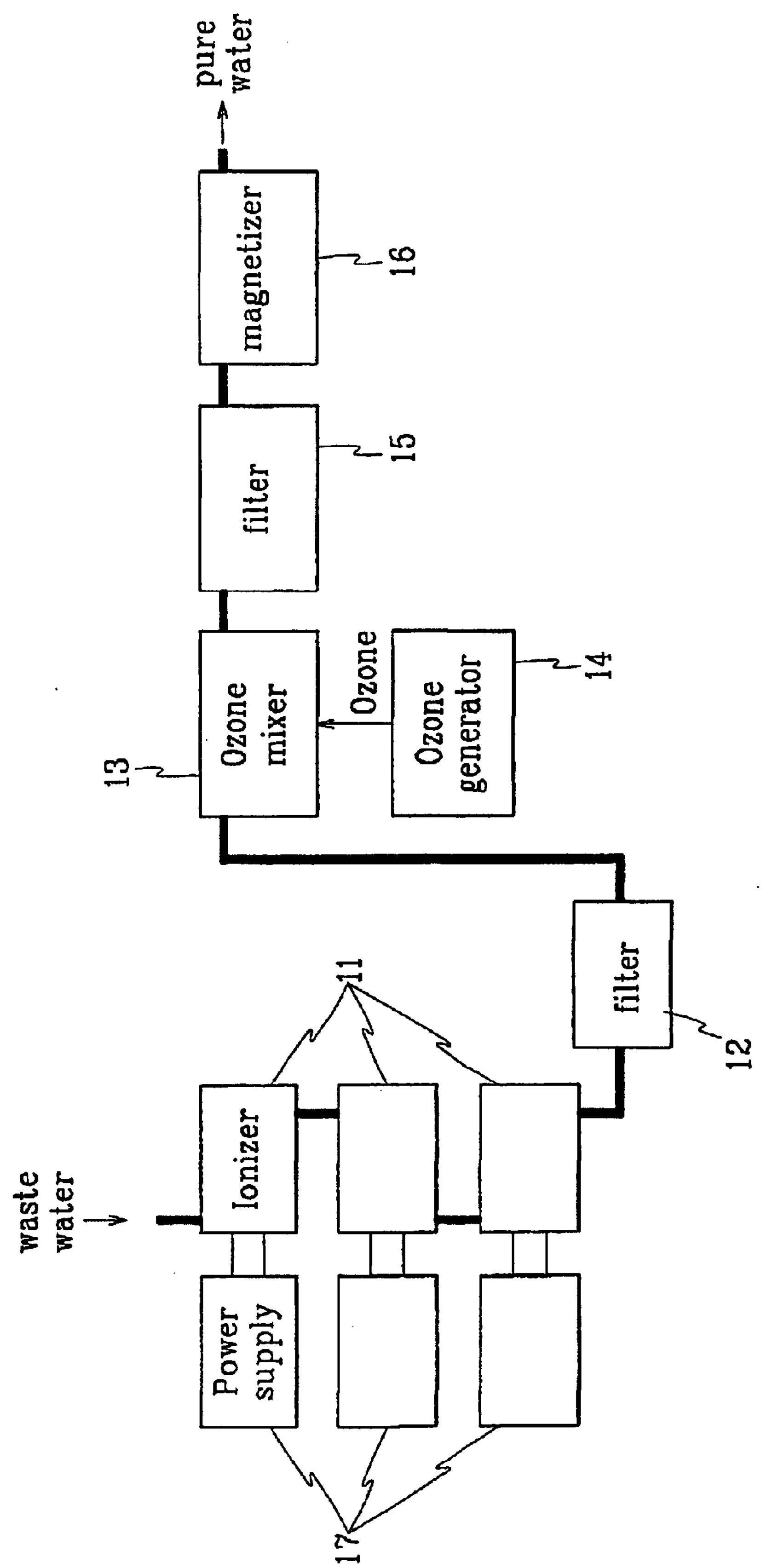
FIG. 1 is a block diagram illustrating a embodiment of a water purification system according to the present invention.

Referring to FIG. 1, a water purification system according to a preferred embodiment of the present invention will be explained. As shown in the figure, the water purification system comprises a plurality of ionizers 11, a plurality of power supplies 17, each of which supplies a high frequency, high voltage power to each of the ionizers, and a first filter unit 12 for filtering contaminants and sludge from the water after it has passed through the ionizers 11. The system further comprises an ozone mixer 13 for introducing ozone into the water, an ozone generator 14 for providing ozone to the ozone mixer 13, and a second filter unit 15 for filtering contaminants and sludge from the water passed through the ozone mixer 13. The system may also comprise a magnetizer 16 for applying a magnetic field to the water to render it potable.

A water source (not shown) supplies water to the plurality of ionizers 11 through a pipe. Contaminants including undegradable materials are ionized and/or decomposed in the ionizer 11 by a high electric field from a high frequency, high voltage power supply.

Figure 2:
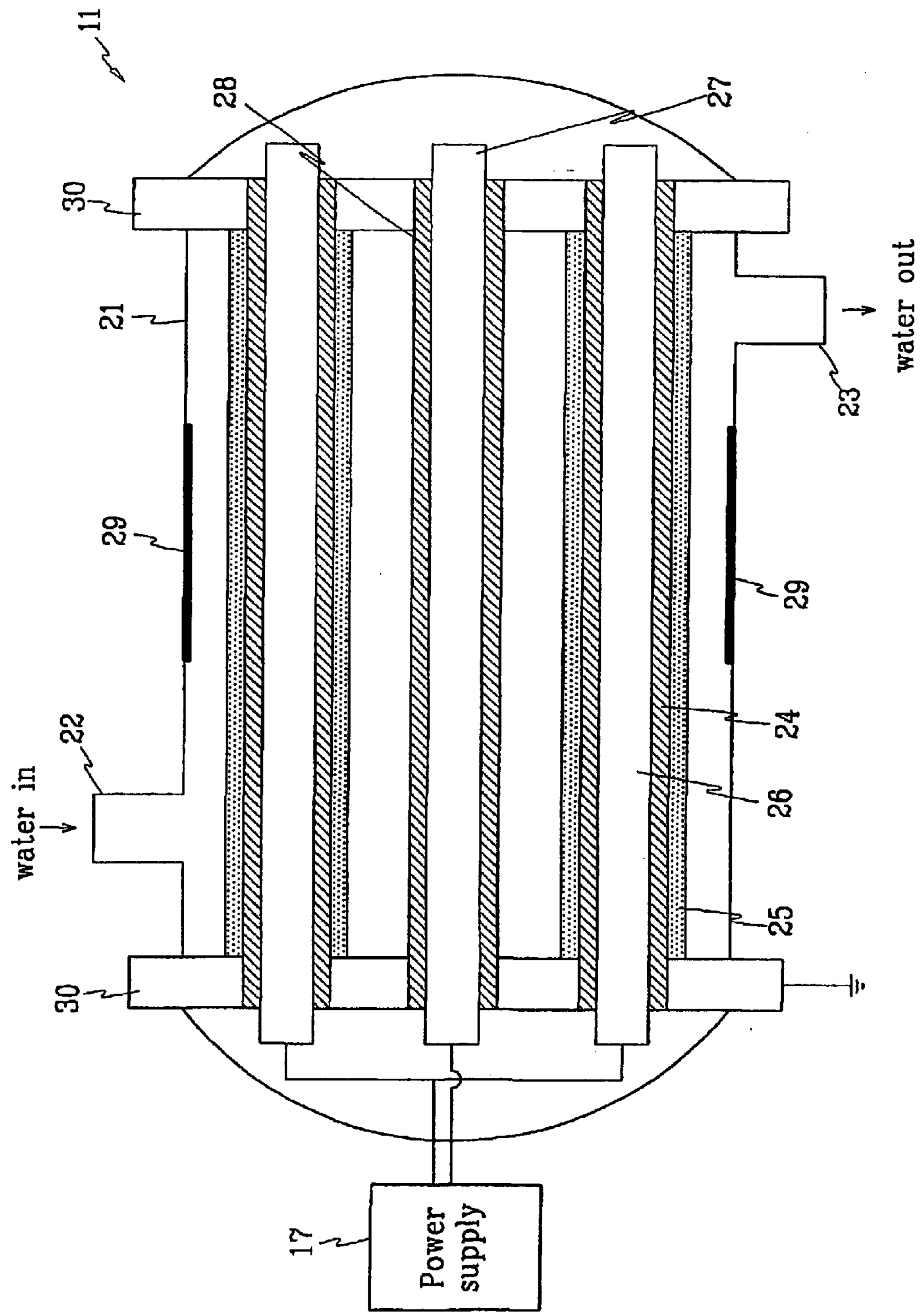
FIG. 2 is a cross-sectional view of an ionizer according to the present invention.
Figure 3:
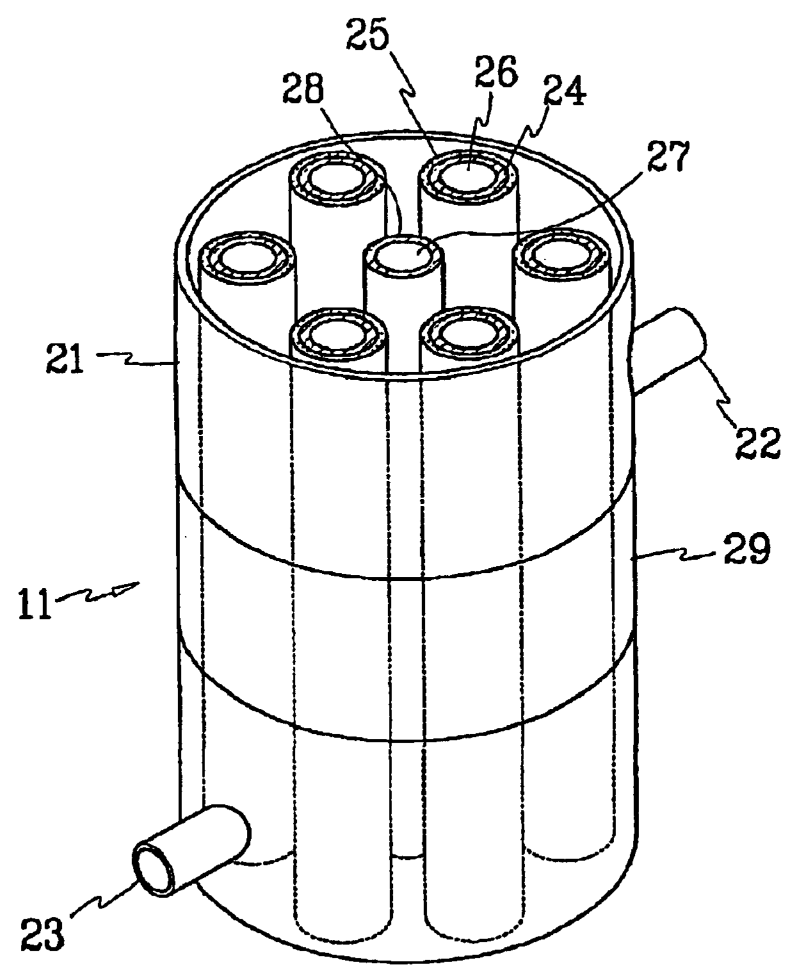
FIG. 3 is a perspective view illustrating the configuration of electrodes of the ionizer according to the present invention.

Referring to FIGS. 2–3, an ionizer according to a preferred embodiment of the present invention will be explained in detail. The ionizer 11 has a cylindrical chamber 21 having an inlet 22 and an outlet 23 for water flow. The chamber 21 is made to permit water to flow along a flow path from the inlet 22 to the outlet 23.

A plurality of electrodes installed in the chamber 21, and they comprise rod cathodes 26 and a rod anode 27. The rod cathodes 26 are placed around the rod anode 27. Although only one rod anode is shown in cathodes around the anodes. Each cathode 26 is surrounded with a coaxial cylindrical dielectric sheath 24 made from a material such as ceramic or glass, so that the cathode 26 can be prevented from directly contacting the water. A coaxial cylindrical mesh grid 25 is provided around each cathode 26.

The anode 27 is also surrounded with a coaxial cylindrical dielectric sheath 28, which is same material as the dielectric sheath 24, so that the anode can also be prevented from directly contacting the water. Both ends of the cylindrical chamber 21 are hermetically capped by a mounting fixture 30 formed to provide a waterproof fit. The mounting fixture 30 may also support electrodes, dielectric sheaths and mesh grids.

The high voltage necessary to drive the electron induction by the cathodes 26 is produced by a power supply 17. The power supply 17 includes a power transformer capable of boosting low AC voltage, which may be any commercially available voltage such as 100V, 220V, 380V or 440V, to a high rectified voltage, usually between 10 and 25 Kilovolts. The power supply 17 further includes a frequency conversion circuits composed of a rectifier and an inverter, such as an insulated gate bipolar transistor (IGBT), which converts into a high frequency ranging between 40 and 60 Kilohertz.

The inventor of the present invention has noted that the voltage required for the electron induction ranges from about 10 to 25 Kilovolts, through a number of experiments. At a fixed voltage, the quantity of electrons induced is roughly proportional to the frequency until an upper frequency limit is reached. The practical frequency range for efficient electron induction usually lies between 40 and 60 kHz.

When the power supply 17 supplies a high voltage to the electrodes, excited electrons are induced from the cathodes, specifically through the dielectric sheath 24, and accelerated by a mesh grid, which is preferably grounded. The accelerated electrons then collide with water molecules as well as contaminants to ionize and/or decompose them. Specifically, contaminants, which are ungradable materials such as heavy metals, CFC, THM or others, become ionized by bombardment of the accelerated electrons.

When the water molecules collide with the accelerated electrons, they generate hydrogen ions. The hydrogen ions perform removal of nitrogen in the water as follows:

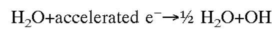

$H_2O$+accelerated $e^- \rightarrow ½\ H_2O+OH^-$

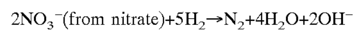

$2NO_3^-$(from nitrate)$+5H_2 \rightarrow N_2+4H_2O+2OH^-$

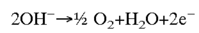

$2OH^- \rightarrow ½\ O_2+H_2O+2e^-$

Dissolved heavy metals such as Ni and Cd may also be ionized by accelerated electrons. They may be combined with hydroxide ions (OH) and then form a flocculent precipitate. Dissolved organic matter may also be ionized and then combined with hydrogen ions.

The chamber 21 may comprise an aluminum layer 29 on its inner surface wall in order to remove phosphate from the water. The aluminum layer 29 is preferably formed along the inner periphery of the inner surface of the chamber and has a predetermined width. The width of the aluminum layer 29 may range from a part of the length of the chamber to the whole length of the chamber.

The aluminum layer 29 is ionized by the bombardment of the accelerated electrons to provide aluminum ions $Al^{3+}$. The aluminum ions can be combined with phosphate ions from phosphate.

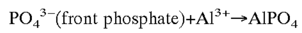

$PO_4^{3-}$(front phosphate)$+Al^{3+} \rightarrow AlPO_4$

The aluminum ions can also be combined with oils and clays which are suspended in the water because the surface charge of the oils and clays is negative.

Although each power supply is disclosed to provide each ionizer with high voltage power in the preferred embodiment, one power supply can energize a plurality of ionizers which are connected in parallel, according to particular applications. Further, the number of ionizers can be adjusted in various applications as necessary.

Insoluble products formed in the ionizer 11 are separated from the water by filtration. That is, the various kinds of sludge, flocculent and sediment in the water, which are formed in the ionizer 11, may be removed while passing through a first filter unit 12.

The water is then provided to the ozone mixer 13 which is located downstream from the first filter unit 12. Ozone is generated in the ozone generator 14, and then provided to the ozone mixer 13.

In the preferred embodiment, the ozone generator 14 may be a corona discharge type generator. The ozone generator 14 of the corona discharge type creates ozone by subjecting a starting gas to a very high electric field. The starling gas may be air which is filtered, or oxygen which is generated by a PSA (pressure swing adsorption) type oxygen production facilities. Typically the strong electric field is supplied from a power supply (not shown) which is a combination of a transformer, a rectifier and an inverter such as an insulated gate bipolar transistor (IGBI). The power supply converts low AC voltage, which may be any commercially available voltage such as 100V, 220V, 380V or 440V at 50Hz/60Hz, to a high rectified voltage 15 Kilovolts at 1000 Hz, which is sufficient to break up oxygen molecules. The high rectified voltage is supplied with two electrodes such that one goes positive when the other is negative. The two electrodes form a sort of capacitor, and usually comprise two parallel plates, concentric cylinders, or some other geometry which allows for a constant distance between the electrodes. The description of the ozone generator 14 may also be modified to explain similar structures, and further descriptions thereof will not be made.

Ozone generated by the ozone generator 14 is provided to the ozone mixer 13, which can be made a static type line mixer or other type of mixer. The filtered water is then mixed with ozone and remains in the ozone mixer 36 for a predetermined time preferably a few minutes.

This step of combining the water with ozone acts to oxidize organic components, coagulate fine particulate so as to improve downstream filtration, and physically destroy most of the bacteria viruses and other microbes present in the water. That is, ozone acts as a powerful oxidant, flocculant and disinfectant without producing toxic by-products.

The second filter unit 15 has a plurality of porous ceramic filters that are capable of removing minute particles in the range of about 1 μm to 0.01 μm. In a preferred embodiment, the second filter unit 15 may have three filters which are capable of filtering within the ranges of 1 μm, 0.1μm, and 0.01 μm, respectively. The various kinds of sludge, flocculent and sediment in the water which are formed in the ozone mixer 13 may be removed by passing it through the second filter unit 15.

Although not required for the operation of this invention, it has been observed that a magnet mounted on the water outlet tends to improve the operation of this invention. The magnetizer 16 has at least one magnet that applies a magnetic field to the filtered water. The water becomes generally unstructured as it passes through the high electric field in the ionizer 11. Therefore, as the water passes through the magnetic field from the magnetizer 16, it takes on a six-sided, hexagonal structure, which is structurally suitable for drinking. Research has shown that human body fluids surrounding healthy cells also exhibit a hexagonal molecular structure. Hexagonal water is better for the human body and health because it matches human body fluids, creating stability.

Table 1 shows the results obtained with the system according to the present invention. It is noted that contaminants are reduced and the purity of the water is enhanced with the present invention.

TABLE 1

| Contaminant | Reference criteria (mg/l) | With the present invention (mg/l) |
|---|---|---|
| Phosphate ions | 7 | — |
| $CN^-$ | 5.4 | — |
| Phenol | 5.4 | — |
| $Fe^{2+}$ | 4 | — |
| $Cu^{2+}$ | 3 | — |
| $NH_4^+$ | 8 | — |
| $NO_3^-$ | 8 | — |
| BOD | 9 | — |
| COD | 11.4 | — |
| Turbidity | 18 | 3 |
| DO | 5.6 | 18 |

It will he apparent to those skilled in the art that various modifications and variations can be made to the device of the present invention without departing front the spirit and scope of the invention. The present invention covers the modifications and variations of this invention provided they come within the scope of the appended claims and their equivalents.

What is claimed is:

1. A water purification system, comprising:

at least one ionizer including:

a cylindrical chamber having an inlet and outlet for water flow;

at least one rod anode which is surrounded with a coaxial cylindrical dielectric sheath;

at least one cylindrical mesh grid which is coaxial with and surrounds the cathode; and an ozone generator for producing ozone; and an ozone mixer for mixing the water with ozone provided by the ozone generator.

2. The water purification system of claim 1, wherein the ozone generator is a corona discharge type.

3. The water purification system of claim 1, wherein the ozone mixer is a static-type line mixer.

4. The water purification system of claim 1, further comprising:

filter means, located downstream from the ionizer and upstream of the ozone mixer, for removing sludge, flocculent and sediment suspended in the water treated by the ionizer.

5. The water purification system of claim 1, further comprising:

filler means, located downstream from the ozone mixer, for removing sludge, flocculent and sediment suspended in the water that has passed through the ozone mixer.

6. The water purification system of claim 1, further comprising:

magnetic means, located downstream from the ozone mixer, for applying a magnetic field to the water that has passed through the ozone mixer.

7. The water purification system of claim 1, wherein the ionizer is supplied with a high voltage ranging from about 10 to 25 Kilovolts at a frequency ranging from 40 to 60 Kilohertz.

8. An ionizer used in a water purification system, comprising:

a cylindrical chamber having an inlet and an outlet for water flow; said chamber made to permit the water to flow along a flow path from the inlet to the outlet;

at least one rod anode which is surrounded with a coaxial cylindrical dielectric sheath;

at least one rod cathode which is surrounded with a coaxial cylindrical dielectric sheath; and at least one cylindrical mesh grid which is coaxial with and surrounds the cathode, wherein both ends of the cylindrical chamber are hermetically capped by a mounting fixture made to provide a waterproof fit.

9. The ionizer of claim 8, wherein an aluminum layer Is formed on the inner surface of the cylindrical chamber.

10. The ionizer of claim 9, wherein the aluminum layer is formed along the inner periphery of the inner surface of the chamber and has a predetermined width.

11. The ionizer of claim 8, wherein the ionizer is supplied with a high voltage ranging from about 10 to 25 Kilovolts at a frequency ranging from 40 to 60 Kilohertz.

12. The ionizer of claim 11, wherein the mesh grid is grounded.

13. The ionizer of claim 8, wherein the material of the dielectric sheath is ceramic or glass.

14. A method for purifying water, comprising the steps of:

(a) providing at least one ionizer adapted to create an electric field;

(b) energizing the ionizer with a high voltage, such that an electric field is created;

(c) passing the water through the ionizer so decomposition and oxidation of the indecomposable materials is performed;

(d) filtering sludge which is formed in the above step;

(e) introducing ozone into the water to mix ozone with the water; and (f) filtering sludge which is formed in the above steps.

15. The method of claim 14, wherein in the energizing step (b), the ionizer is supplied with a high voltage ranging from about 10 to 25 Kilovolts at a frequency ranging from 40 to 60 Kilohertz.

16. The method of claim 14, further comprising the step of:

applying a magnetic field to the water.

* * * * *